(12) United States Patent
Haflinger

(10) Patent No.: US 6,530,645 B2
(45) Date of Patent: Mar. 11, 2003

(54) PRINT MASKS FOR HIGH SPEED INK JET PRINTING

(75) Inventor: James Haflinger, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/745,201

(22) Filed: Dec. 20, 2000

(65) Prior Publication Data

US 2002/0122094 A1 Sep. 5, 2002

Related U.S. Application Data

(60) Provisional application No. 60/331,373, filed on Apr. 3, 2000.

(51) Int. Cl.[7] .............................. B41J 2/145; B41J 2/15
(52) U.S. Cl. ........................................................... 347/41
(58) Field of Search ................................ 347/41, 40, 9

(56) References Cited

U.S. PATENT DOCUMENTS

| | | | |
|---|---|---|---|
| 4,963,882 A | 10/1990 | Hickman | 347/41 |
| 4,967,203 A | 10/1990 | Doan et al. | 347/41 |
| 5,239,312 A | 8/1993 | Mema et al. | 347/41 |
| 5,555,006 A | 9/1996 | Cleveland et al. | 347/41 |
| 5,648,805 A | 7/1997 | Keefe et al. | 347/65 |
| 5,648,806 A | 7/1997 | Steinfield et al. | 347/87 |
| 5,790,150 A | 8/1998 | Lidke et al. | 347/41 |
| 6,190,000 B1 * | 2/2001 | Krouss et al. | 347/40 |
| 6,315,388 B1 * | 11/2001 | Goh | 347/40 |

FOREIGN PATENT DOCUMENTS

| | | |
|---|---|---|
| EP | 0 554 907 A2 | 8/1993 |
| JP | 0 914 948 A2 | 5/1999 |

* cited by examiner

Primary Examiner—Thinh Nguyen
(74) Attorney, Agent, or Firm—Milton S. Sales; Thomas R. Arno

(57) ABSTRACT

A method of ink jet printing uses only selected nozzles of a print head to reduce the time required to print onto pixel locations as the print head is scanned over the surface of a piece of media. Print carriage speed during printing may thus be increased.

19 Claims, 16 Drawing Sheets

ADDRESS LINE

| 1 | 2 | 3 | 4 | 5 | 6 | 7 | 8 | 9 | 10 | 11 | 12 | 13 |
|---|---|---|---|---|---|---|---|---|----|----|----|----|
| 1 | 14 | 8 | 2 | 3 | 16 | 10 | 4 | 5 | 18 | 12 | 6 | 7 |
| 20 | 21 | 15 | 9 | 22 | 23 | 17 | 11 | 24 | 25 | 19 | 13 | 26 |
| 27 | 40 | 34 | 28 | 29 | 42 | 36 | 30 | 31 | 44 | 38 | 32 | 33 |
| 46 | 47 | 41 | 35 | 48 | 49 | 43 | 37 | 50 | 51 | 45 | 39 | 52 |
| 53 | 66 | 60 | 54 | 55 | 68 | 62 | 56 | 57 | 70 | 64 | 58 | 59 |
| 72 | 73 | 67 | 61 | 74 | 75 | 69 | 63 | 76 | 77 | 71 | 65 | 78 |
| 79 | 92 | 86 | 80 | 81 | 94 | 88 | 82 | 83 | 96 | 90 | 84 | 85 |
| 98 | 99 | 93 | 87 | 100 | 101 | 95 | 89 | 102 | 103 | 97 | 91 | 104 |
| 105 | 118 | 112 | 106 | 107 | 120 | 114 | 108 | 109 | 122 | 116 | 110 | 111 |
| 124 | 125 | 119 | 113 | 126 | 127 | 121 | 115 | 128 | 129 | 123 | 117 | 130 |
| 131 | 144 | 138 | 132 | 133 | 146 | 140 | 134 | 135 | 148 | 142 | 136 | 137 |
| 150 | 151 | 145 | 139 | 152 | 153 | 147 | 141 | 154 | 155 | 149 | 143 | 156 |
| 157 | 170 | 164 | 158 | 159 | 172 | 166 | 160 | 161 | 174 | 168 | 162 | 163 |
| 176 | 177 | 171 | 165 | 178 | 179 | 173 | 167 | 180 | 181 | 175 | 169 | 182 |
| 183 | 196 | 190 | 184 | 185 | 198 | 192 | 186 | 187 | 200 | 194 | 188 | 189 |
| 202 | 203 | 197 | 191 | 204 | 205 | 199 | 193 | 206 | 207 | 201 | 195 | 208 |

*FIG. 6A*

POWER LINE

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 1 | 2 | 27 | 28 | 53 | 54 | 79 | 80 | 105 | 106 | 131 | 132 | 157 | 158 | 183 | 184 |
| 3 | 4 | 29 | 30 | 55 | 56 | 81 | 82 | 107 | 108 | 133 | 134 | 159 | 160 | 185 | 186 |
| 5 | 6 | 31 | 32 | 57 | 58 | 83 | 84 | 109 | 110 | 135 | 136 | 161 | 162 | 187 | 188 |
| 7 | 8 | 33 | 34 | 59 | 60 | 85 | 86 | 111 | 112 | 137 | 138 | 163 | 164 | 189 | 190 |
| 9 | 10 | 35 | 36 | 61 | 62 | 87 | 88 | 113 | 114 | 139 | 140 | 165 | 166 | 191 | 192 |
| 11 | 12 | 37 | 38 | 63 | 64 | 89 | 90 | 115 | 116 | 141 | 142 | 167 | 168 | 193 | 194 |
| 13 | 14 | 39 | 40 | 65 | 66 | 91 | 92 | 117 | 118 | 143 | 144 | 169 | 170 | 195 | 196 |
| 15 | 16 | 41 | 42 | 67 | 68 | 93 | 94 | 119 | 120 | 145 | 146 | 171 | 172 | 197 | 198 |
| 17 | 18 | 43 | 44 | 69 | 70 | 95 | 96 | 121 | 122 | 147 | 148 | 173 | 174 | 199 | 200 |
| 19 | 20 | 45 | 46 | 71 | 72 | 97 | 98 | 123 | 124 | 149 | 150 | 175 | 176 | 201 | 202 |
| 21 | 22 | 47 | 48 | 73 | 74 | 99 | 100 | 125 | 126 | 151 | 152 | 177 | 178 | 203 | 204 |
| 23 | 24 | 49 | 50 | 75 | 76 | 101 | 102 | 127 | 128 | 153 | 154 | 179 | 180 | 205 | 206 |
| 25 | 26 | 51 | 52 | 77 | 78 | 103 | 104 | 129 | 130 | 155 | 156 | 181 | 182 | 207 | 208 |

FIG. 6B

PRINT MASKS FOR HIGH SPEED INK JET PRINTING

CROSS REFERENCE TO RELATED APPLICATION

This application claims priority to prior U.S. patent application Ser. No. 09/477,265, entitled "PRINT MASKS FOR HIGH SPEED INK JET PRINTING," which was filed on Jan. 4, 2000, and which was converted to Provisional Application No. 60/331,373 on Apr. 3, 2000.

BACKGROUND OF THE INVENTION

In on-demand ink jet printing, a grid of pixel locations is defined on a print media surface. During the print process, each pixel location may receive a droplet of ink from a set of ink ejection nozzles on a print head as the print head passes horizontally over the print media surface. In many systems, the pixel grid may be considered to comprise a series of vertical columns of pixel positions, and the ejection nozzles are also functionally organized as a vertical column. The vertical spacing between nozzles corresponds to the vertical pixel spacing, which will typically be approximately 50 to 600 pixels per inch, resulting in a vertical inter-nozzle spacing of about 40 to 500 microns. As the vertical column of nozzles passes over each vertical column of pixel locations, the appropriate droplets are deposited. In some printers, known as "page wide" printers, the vertical column of nozzles spans one dimension of the image, and image generation is performed by incrementing the media beneath the print head in the orthogonal dimension. In most printer designs, however, the vertical column of nozzles is much shorter in length than the total number of pixels in a vertical pixel column of the whole image, and the nozzles are mounted on a moveable print carriage. In these printer embodiments, the print head is sequentially passed over one horizontally extending swath of the image at a time, and the media is incremented between each pass.

It has been found that the print quality of images produced by moving carriage printers is improved dramatically with the use of "multi-pass" print techniques. In these print methods, portions of the nozzle column pass over the same segment of media two, four, six, or even more times, with each pass laying down a fraction of the ink droplets required to complete a swath. This technique avoids several print quality problems that are associated with depositing a large amount of ink in a single pass of the print head.

Unfortunately, however, with the same print carriage speed, the increased quality of four or six pass print modes comes at the price of a four or six fold increase in print time. Unless the print carriage speed is increased, therefore, the additional passes result in a severe reduction of printer throughput.

The speed at which the print head travels is limited by two factors. The first is the fact that a given nozzle can only be fired at a pre-determined maximum rate. In a single pass mode, therefore, the carriage cannot travel over more pixel columns per second than the maximum firing rate of the nozzles. This limitation is not a significant concern with the use of multi-pass print modes, however, because the nozzles can be programmed to skip certain pixels on certain passes. In a two-pass print mode, for example, the carriage speed can be doubled over the single pass speed because it is possible to ensure that a given nozzle only prints on at most every other pixel location as it passes over the pixel columns.

Although it first appears that increasing the number of passes in a multi-pass print mode would always allow a corresponding increase in print head speed, this is not the case because of a second factor which limits print head speed. This factor is the additional minimum time required to deposit ink onto any individual one of the pixel columns. One reason for this minimum time is that in most print head designs, the vertical column of nozzles is actually arranged as a horizontally spaced series of sub-columns. These sub-column arrangements are used because the simultaneous firing of too many nozzles, especially adjacent nozzles, is undesirable. In thermally activated print heads, for example, the firing of too many nozzles simultaneously results in a large power dissipation which is expensive to supply and which causes an excessive temperature increase in the print head. In addition, in both thermally and piezoelectrically actuated print heads, the firing of one or a set of nozzles may cause droplet volume and velocity changes or may otherwise interfere with the firing of other nozzles of the print head.

In one commercially available thermal print head from Lexmark Corp., for example, a nozzle array of 208 nozzles is divided into two separate columns of 104 nozzles, with each of the two columns being further arranges as 13 horizontally adjacent sub-columns of 8 nozzles each. As a column of nozzles passes over a pixel column, the 13 sub-columns are enabled sequentially as they become approximately centrally positioned over the pixel column. With this print head, each nozzle requires about 3 micro seconds to deposit an ink droplet. The nozzle column must therefore remain over each pixel column for at least about 13×3=39 microseconds. If the pixel columns are 1/600 inches wide (i.e., the printer is a 600 dpi printer), the maximum speed of the print head over the media is about 40 inches per second. It has therefore been found that carriage speed in four, six, or eight pass print modes, for example, cannot be increased significantly above what is possible in two pass mode. The increase quality provided by the additional passes results in a proportional increase in the time it takes to print an image. Increases in carriage speed are thus highly desirable, as they would allow improvement in printer throughput without sacrificing print quality.

SUMMARY OF THE INVENTION

In one embodiment, a method of increasing the speed of multi-pass printing onto a series of adjacent pixel columns with an ink jet print head is provided. The ink jet print head comprises a plurality of sub-columns of ink ejection nozzles actuated by a corresponding plurality of address lines, and the method comprises asserting only a pre-defined subset of the address lines within each of the pixel columns.

Embodiments of ink jet printers are also provided. In one advantageous embodiment, an ink jet printer comprises processing and logic circuitry for controlling ink ejection by selectively asserting address and power lines of an ink jet print head in accordance with print data and a print mask. The printer further comprises a memory coupled to the processing and logic circuitry for storing the print mask. The print mask defines a droplet deposition pattern for each nozzle which guarantees, regardless of print data content, that at most only approximately half of the address lines will be required to be asserted as the print head passes over each pixel column of the image being printed. This makes it unnecessary to move the print head slow enough to assert all of the address lines over each pixel column and thus allows for a higher print head speed over the print media.

BRIEF DESCRIPTION OF THE DRAWINGS

FIGS. 6A and 6B are charts of nozzle assignments to power and address lines for the 208 nozzle print head of FIG. 3.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
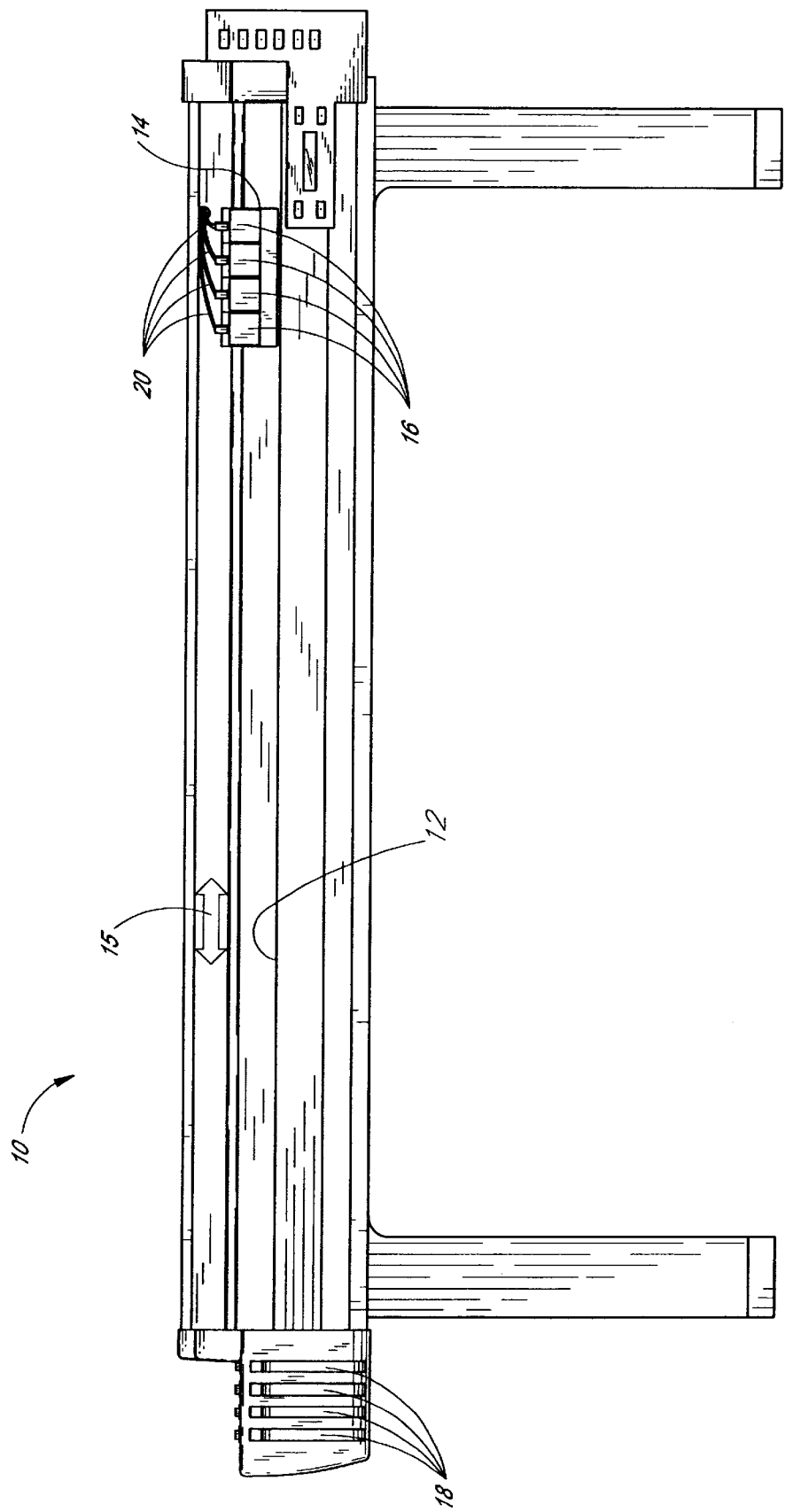
FIG. 1 is a front view of a floor standing ink jet printer in which the invention finds advantageous application.

The invention has application to ink jet printers and printing methods, and accordingly, FIG. 1 illustrates one possible ink jet printer configuration which may embody the invention. The specific embodiment of FIG. 1 is a floor standing printer 10 comprising a platen 12 forming a printing surface. The printer also comprises a print carriage 14 which traverses horizontally across the platen 12 in the direction of arrow 15. Installed in the print carriage 14 are a plurality of ink jet print heads 16, which selectively eject ink droplets downward onto the print surface. Ink ejection is controlled by the printer to deposit ink droplets onto selected pixel locations of a grid of pixel locations having a given dot-per-inch (dpi) resolution in the horizontal and vertical dimensions. The grid of pixel locations defines a series of vertically extending pixel columns and horizontally extending pixel rows. The pixel rows which extend horizontally, parallel to carriage 14 travel, are often referred to as raster lines. Each print head 16 receives ink from an ink reservoir 18 through an associated ink feed tube 20. During print operations, a media drive system advances a piece of media across the print surface in a direction perpendicular to the direction of carriage 14 travel (that is, into or out of the plane of FIG. 1) in between horizontal passes of the print carriage over the media surface. This process builds an image from a series of deposited swaths of ink droplets.

These aspects of ink jet printers are well known and conventional, and a wide variety of alternative configurations exits. For example, the print surface 12 could be placed in any orientation with respect to the floor. It will accordingly be appreciated that the terms horizontal and vertical as used herein merely refer to any two substantially perpendicular directions. Consistent with convention, "vertical" is generally used herein to denote the direction of media travel during printing, and "horizontal" is generally used herein to denote the direction of carriage travel during printing, regardless of how these operations are oriented with respect to, for example, the floor of the room the printer stands on. It will also be appreciated that non-moving print heads may be used in page wide printing, wherein one or more ink jet print heads span the entire page width and printing is performed as the media is advanced beneath. The print heads may be drop-on-demand print heads which are thermally actuated or piezoelectrically actuated. In all of these embodiments, however, the print heads 16 comprise nozzle arrays for selectively ejecting droplets of ink onto the desired pixel locations at the resolution for which printer performance was designed. Specific nozzle arrays for which the invention finds especially advantageous application are illustrated in FIGS. 3 and 4.

Figure 2:
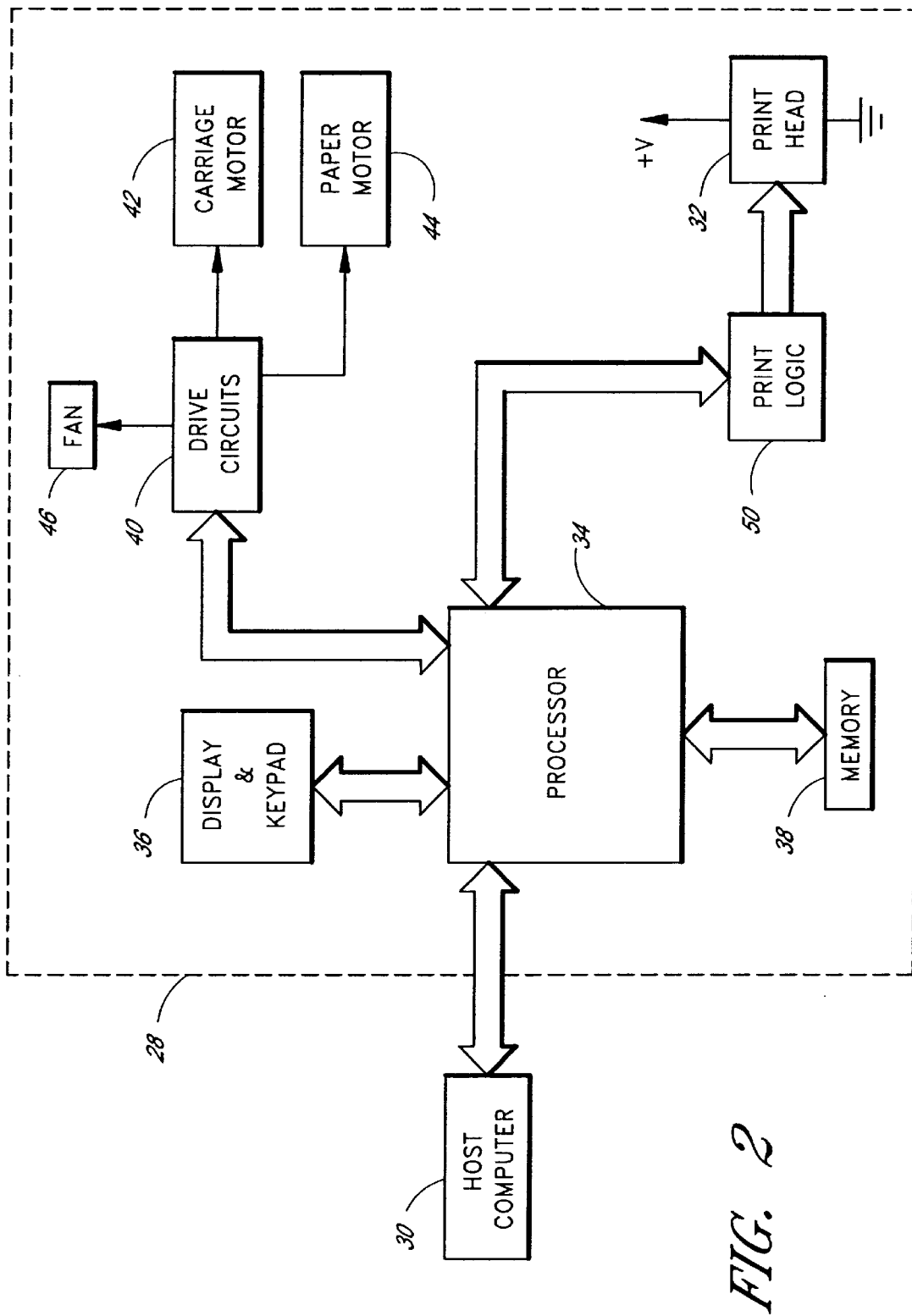
FIG. 2 is a block diagram of internal ink jet printer components.

Referring now to FIG. 2, various components of a typical inkjet printer 28, having a host computer 30 coupled thereto, is illustrated. These various components include control electronics of the ink jet printer which are used to control ink droplet ejection from the ink jet nozzles of a print head 32. A host computer 30 communicates with a processor 34 integral with the ink jet printer 28. The host computer 30 runs driver software which issues print commands and sends data to the ink jet printer 28. As is conventional in ink jet printers, the processor 34 communicates with a display and keypad 36, memory 38, and drive circuits 40 which control the print carriage motor 42 and paper motor 44 as well as powering a fan 46. In addition, the processor 34 routes signals to print logic 50, which actuates the ink jet nozzles of the ink jet print head 32.

The processor 34, in accordance with internal firmware stored in a portion of the memory 38, selectively ejects ink droplets from the nozzles of the ink jet print head of each cartridge. The programming of the processor thus determines which nozzle of the print head is assigned to be used to eject an ink droplet onto any given grid location of the printed image when the relevant swath being printed calls for a droplet at that given grid location. In multi-pass printing, the set of nozzle to grid location assignments is commonly referred to as a print mask, and the print mask definition is stored in memory 38 in the inkjet printer. The function and operation of a print mask is described in further detail below with reference to FIGS. 7 and 8.

Figure 3:
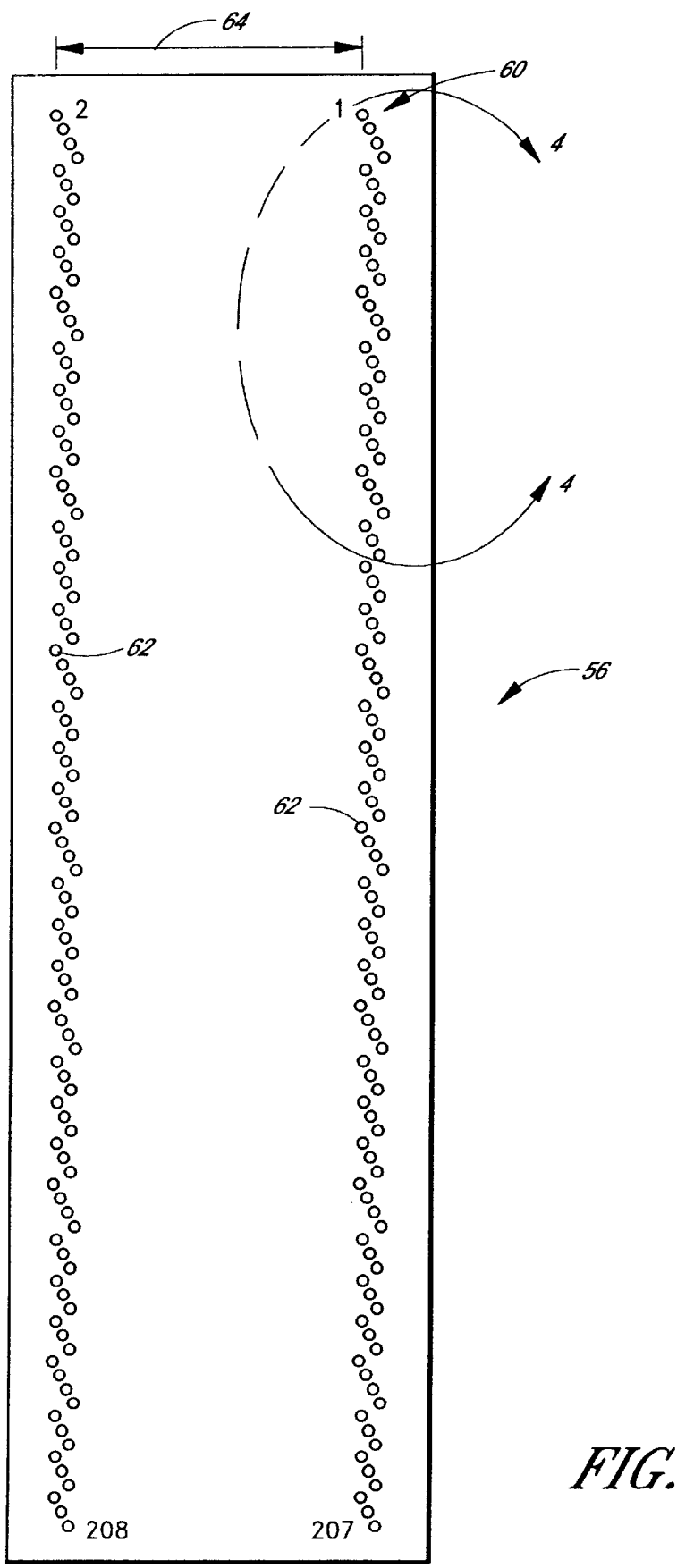
FIG. 3 is a plan view of one exemplary embodiment of an ink jet print head showing one specific 208 nozzle array configuration.
Figure 4:
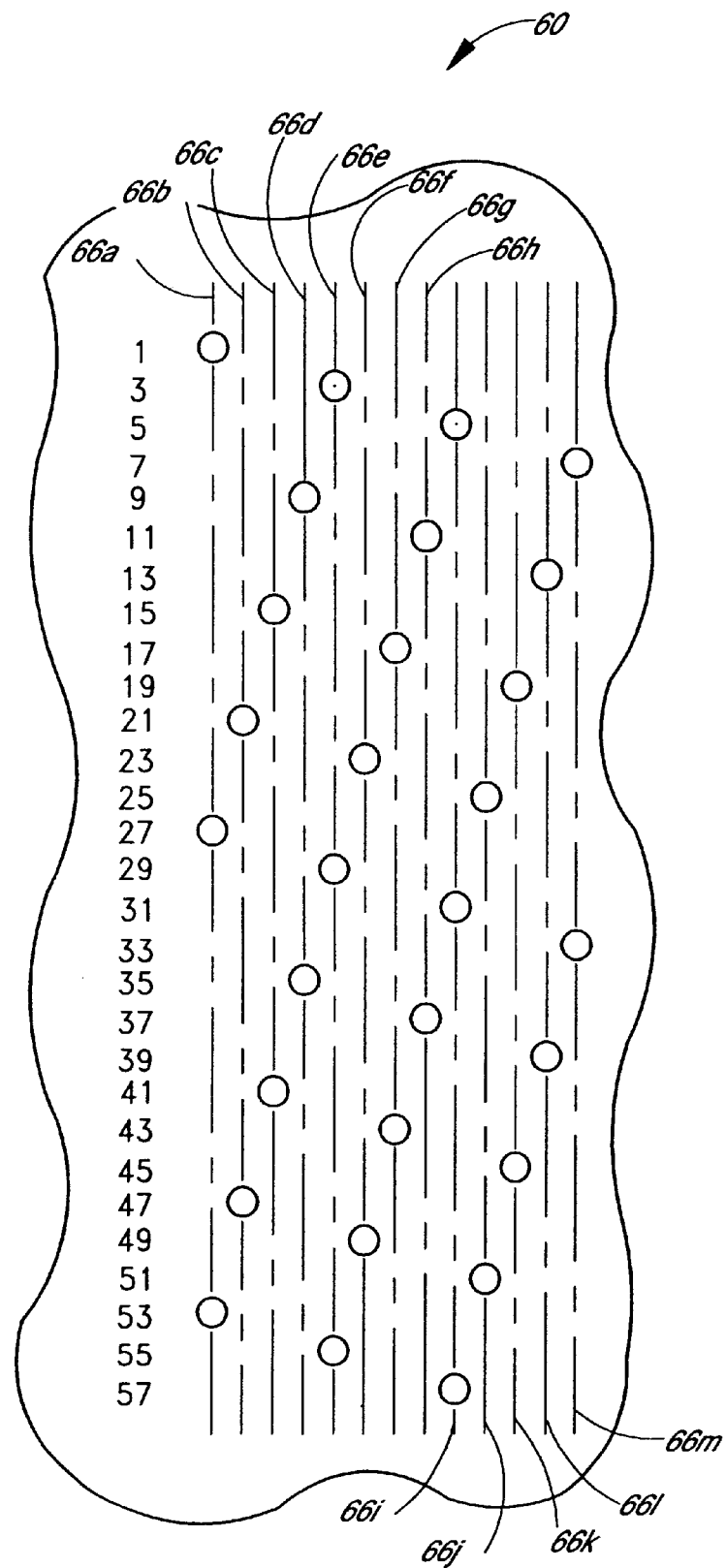
FIG. 4 is a close-up view of the print head of FIG. 3 within the area designated 4—4 in FIG. 3.

Referring now to FIG. 3, the face of a print head 56 is illustrated which includes two vertical columns 58, 60 of nozzles. Each nozzle 62 communicates with an ink reservoir which replenishes the ink after a nozzle has ejected an ink droplet.

In the illustrated embodiment, each of the columns 58, 60 have 104 nozzles. As will be explained in further detail below, and as is best illustrated in FIG. 4, the nozzles of each vertical column 58, 60 are not exactly vertically aligned, but are arranged into a plurality of horizontally spaced sub-columns. Although this multiple sub-column arrangement is important to printer operation, the horizontal displacement is relatively small compared to the vertical separation between nozzles. In one commercially available print head, the nozzles in each column provide a 300 dots-per-inch (dpi) resolution, so that the vertical distance between vertically adjacent nozzles is 1/300 inches or about 85 microns. In this embodiment the horizontal distance between horizontally adjacent sub-columns is a little over 3 microns such that the total horizontal distance between the leftmost sub-column and the rightmost sub-column is less than a 1/600 inch horizontal pixel spacing.

The vertical nozzle positions for the two columns 58, 60 are vertically interleaved by one pixel spacing each, whereas the vertical nozzle spacing within each column is two vertical pixel spacings. The horizontal separation designated by arrow 64 between each column is generally much larger than the vertical nozzle separations, and may be 8, 16 or more horizontal pixel spacings. This horizontal separation is typically a selected integer number of horizontal pixel spacings, however, so that during the print process, the columns of nozzles 58, 60 cross over different vertical pixel columns simultaneously. The interleaving produces an overall vertical print resolution of double the nozzles per inch provided in any one column 58, 60. In the embodiment of FIG. 3, if each column 58, 60 were 300 nozzles per inch, the print head would print a vertically extending swath having a height of 208 600 dpi pixels as it traveled across the media. As shown in FIG. 3, it is conventional to number the nozzles according to their vertical position on the print head. Due to the interleaved nozzle positions in each column, this results in nozzle 1 being in the right column 60, nozzle 2 in the left column 58, nozzle 3 in the right column 60, nozzle 4 in the left column 58, and so on, such that all odd numbered nozzles are in the right column 60 and all the even numbered nozzles are in the left column 58.

FIG. 4 shows a close up views of the top 29 nozzles of the rightmost column 60 of FIG. 3, which comprises all odd numbered nozzles through nozzle 57. As can be seen in these Figures, the column of nozzles 60 is organized as thirteen separate sub-columns, designated 64a–64m in FIG. 4. For purposes of clarity of illustration, the horizontal scale of this Figure is not the same as the vertical scale. The horizontal sub-column spacing is shown larger in FIG. 4 relative to vertical nozzle spacings than is actually the case. At the top of each sub-column is one of the first thirteen odd numbered nozzles. Following the top nozzle, each sub-column includes every thirteenth following odd nozzle. Thus, the first sub-column 64a begins with nozzle 1, the next nozzle of this column is nozzle 27, then nozzle 53, etc. In the embodiment of FIG. 4, the second column 64b begins with nozzle 21 of the column, and continues with nozzle 47, and so on.

As the print head passes rightward over a vertical column of pixels, the nozzles in sub-column 64m are enabled first as this sub-column is the first one to be properly positioned. Similarly, sub-columns 64l, 64k, and so on through 64a are successively enabled as they are successively positioned approximately over the center of the vertical pixel column. Following ink ejection from sub-column 64a, sub-column 64m is enabled as this sub-column becomes centrally positioned over the next adjacent vertical pixel column. Therefore, even when depositing droplets on every pixel in a vertical column, only a subset (about one-thirteenth) of the nozzles is ever fired simultaneously.

Figure 5:
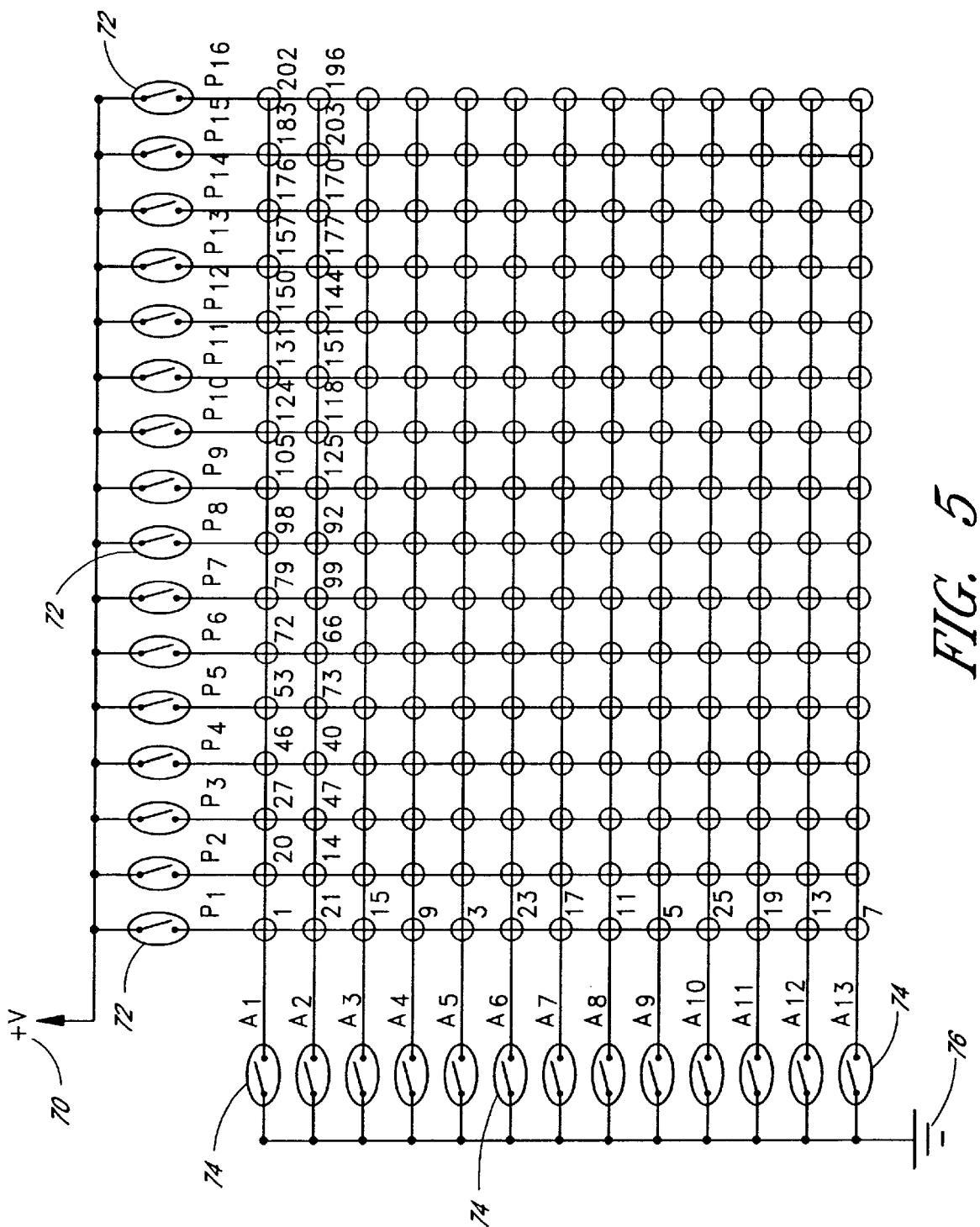
FIG. 5 is a schematic diagram of power and address lines used to actuate the nozzles of FIGS. 3 and 4.

FIG. 5 shows a schematic of nozzle actuation electronics which may be used to perform this sequential sub-column firing. The circuitry shown in FIG. 5 is advantageously implemented on an integrated circuit. The circuit shown may be used to actuate the two column array of 208 nozzles illustrated in FIGS. 3 and 4. As shown in FIG. 5, the circuit is best illustrated as a grid of sixteen power lines (denoted P1–P16) and thirteen address lines (denoted A1–A13). The power lines P1–P16 are each connected to a source of power 70 through a separate switch 72. The address lines A1–A13 are each connected to ground 76 through another set of respective switches 74. Each switch 72, 74 is typically implemented as a transistor which is selectively switched into an on state by print head control logic. If a switch 72, 74 associated with a given power or address line is in an on state, that power line or address line is referred to herein as "asserted". Ink is ejected from a selected nozzle when the power and address lines associated with that nozzle are asserted by the print head control logic.

To perform the sequential sub-column actuation described above, each address line is associated with one sub-column. Address line A1, for example, is connected to all the nozzles positioned in sub-column 64a of FIG. 4. This is illustrated in FIG. 5 by the nozzle numbers 1, 27, 53, 79, 105, 131, 157, and 183 being associated with node locations connected to line A1 of that Figure. Address line A1 is also associated with the first sub-column of the leftmost column 58 of FIG. 3, which contains even numbered nozzles 20, 46, 72, 98, 124, 150, 176, and 202. During printing, as the sub-columns of nozzles pass over a pixel column, A1 is asserted, and then selected power lines are asserted. A2 is then asserted, and another set of power lines is asserted. As one illustrative example, if the twelfth pixel of the thirty-seventh raster line is to receive an ink droplet in a particular pass of the print head across the media, line A8 is asserted just prior to asserting P3 as the right column 60 which contains nozzle 37) passes over the twelfth pixel column. In typical prior art printers, all thirteen address lines are sequentially asserted (or "strobed") as the nozzle column passes over each pixel column. As described briefly above, to eject an ink droplet, an address line must be asserted for about three microseconds. Strobing all thirteen address lines with each pixel column puts an upper bound on print head speed over the media if ink droplets are to be placed on the pixel column. Additional information concerning the structure and operation of thermal ink jet print heads built in accordance with these general principles may be found in U.S. Pat. No. 5,648,805 to Keefe et al., the disclosure of which is hereby incorporated by reference in its entirety.

FIGS. 6A and 6B show the nozzle assignments to power and address lines for the commercially available 208 nozzle print head array arranged as described above with reference to FIGS. 3 and 4. By locating a selected nozzle on the table of FIG. 6A, the correct address to be asserted is determined. Locating the same nozzle on the table of FIG. 6B, the correct power line to assert is determined.

Figure 7:
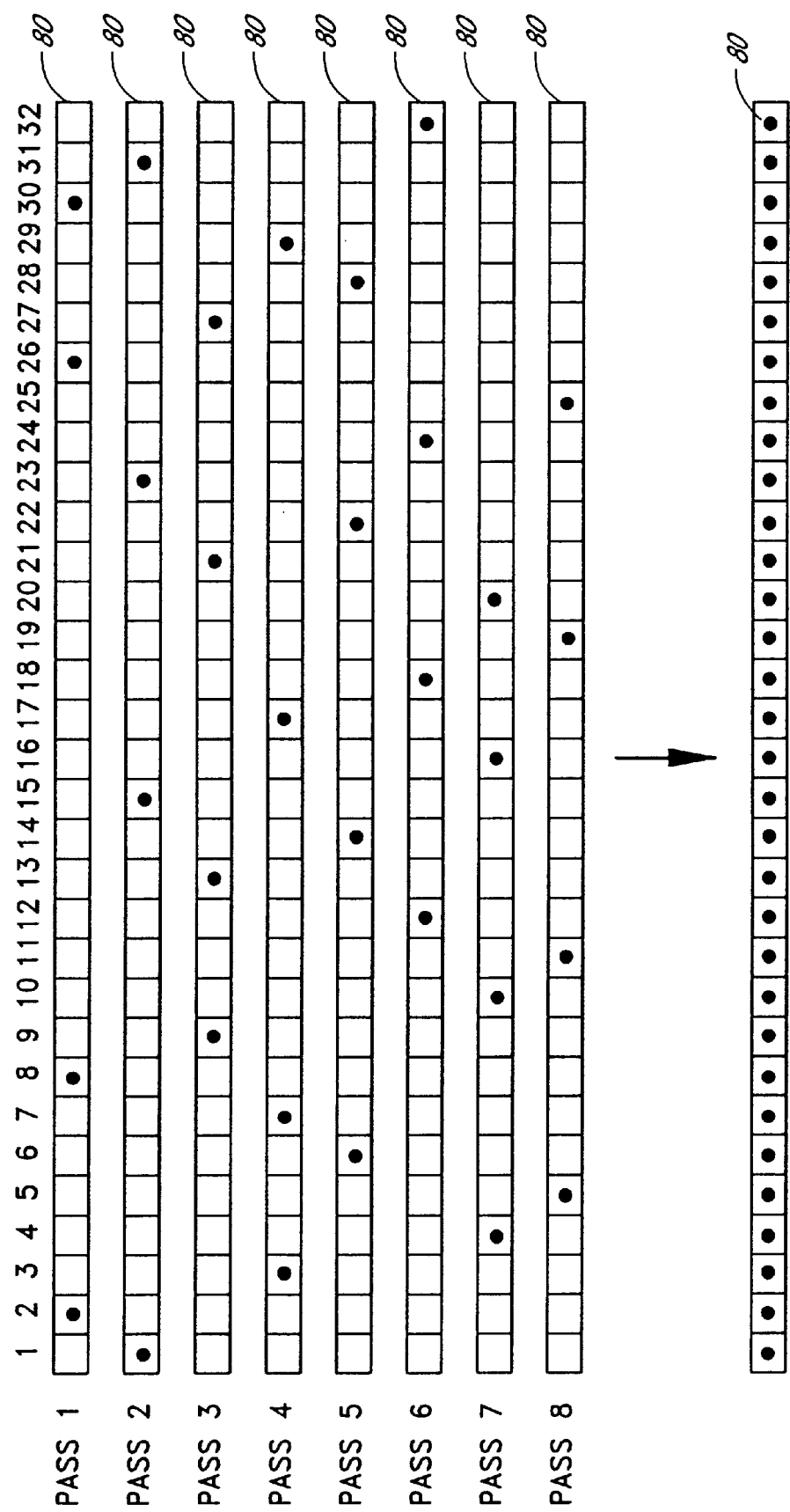
FIG. 7 illustrates the droplet deposition onto a raster line of an image in an eight pass mode using print masks in accordance with one embodiment of the invention.
Figure 8:
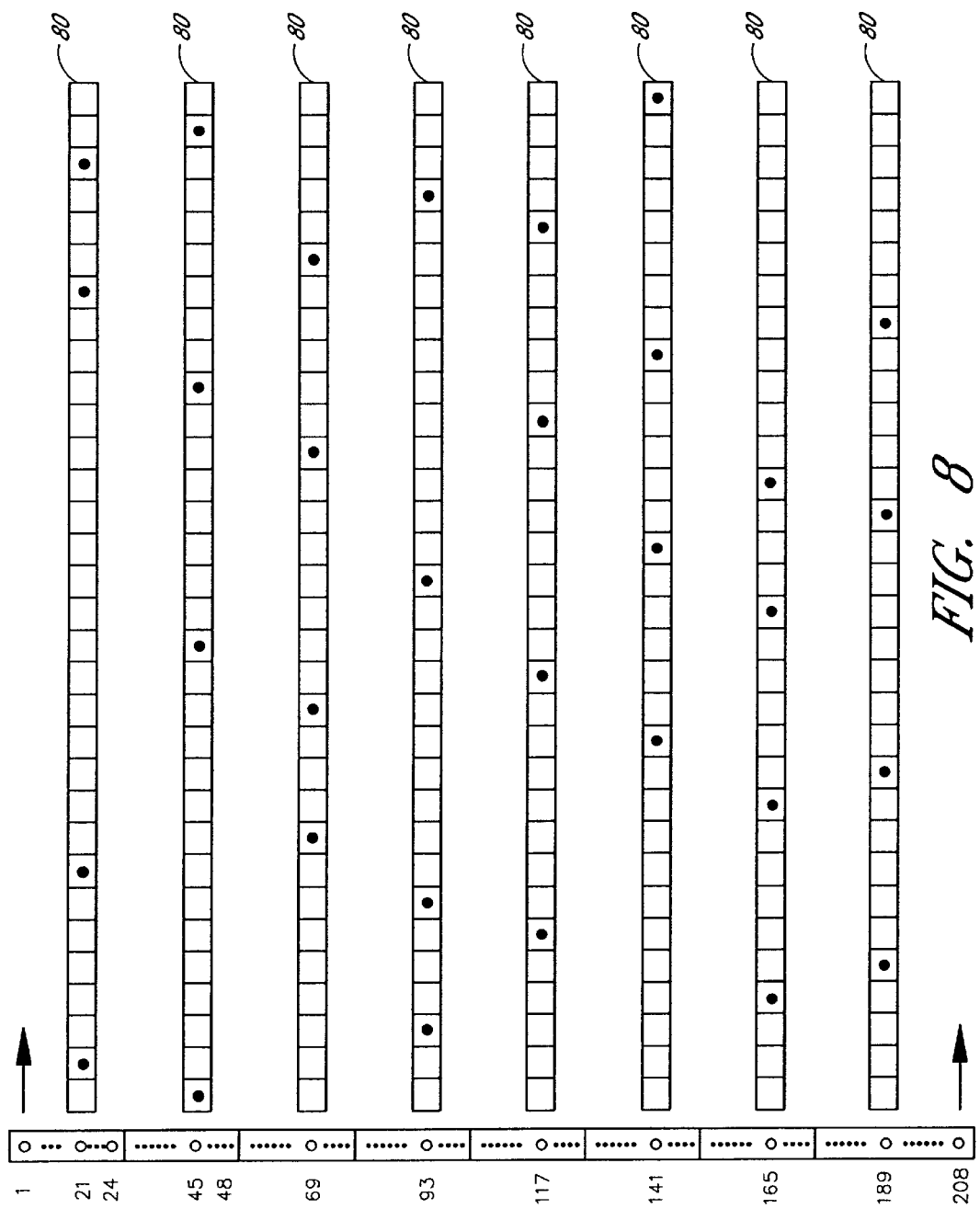
FIG. 8 illustrates print masks for nozzles 21, 45, 69, 93, 117, 141, 165, and 189 of the 208 nozzle print head of FIG. 3 in accordance with an eight pass embodiment of the invention.
Figure 9:
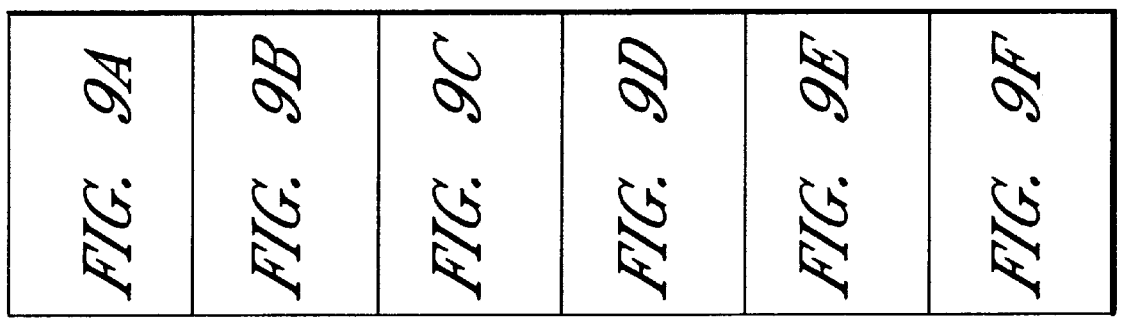
FIGS. 9A–9F shows eight pass print masks for each of the 192 utilized nozzles of the 208 nozzle print head of FIG. 3 in accordance with one embodiment of the invention.
Figure 9A:
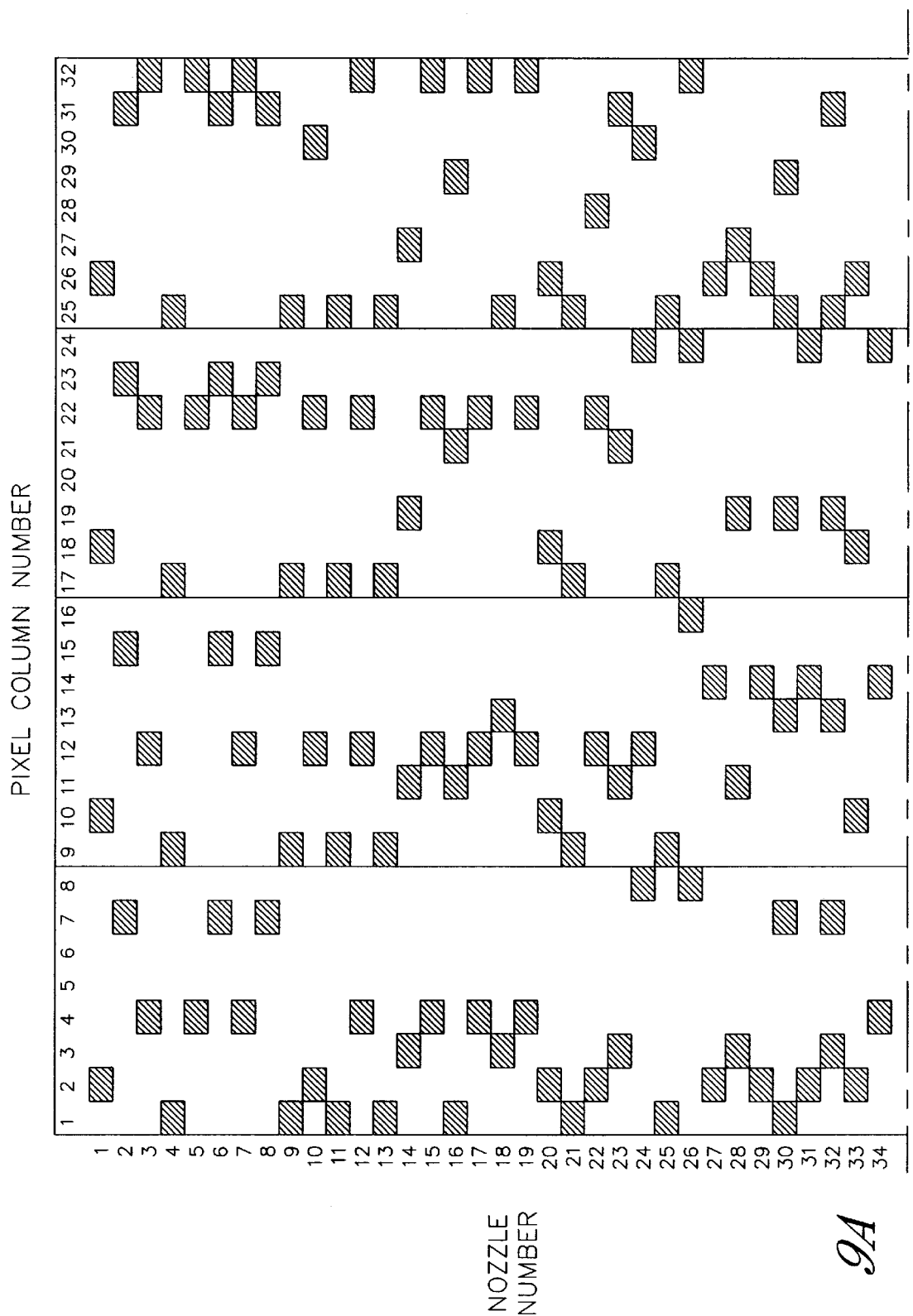
Figure 9B:
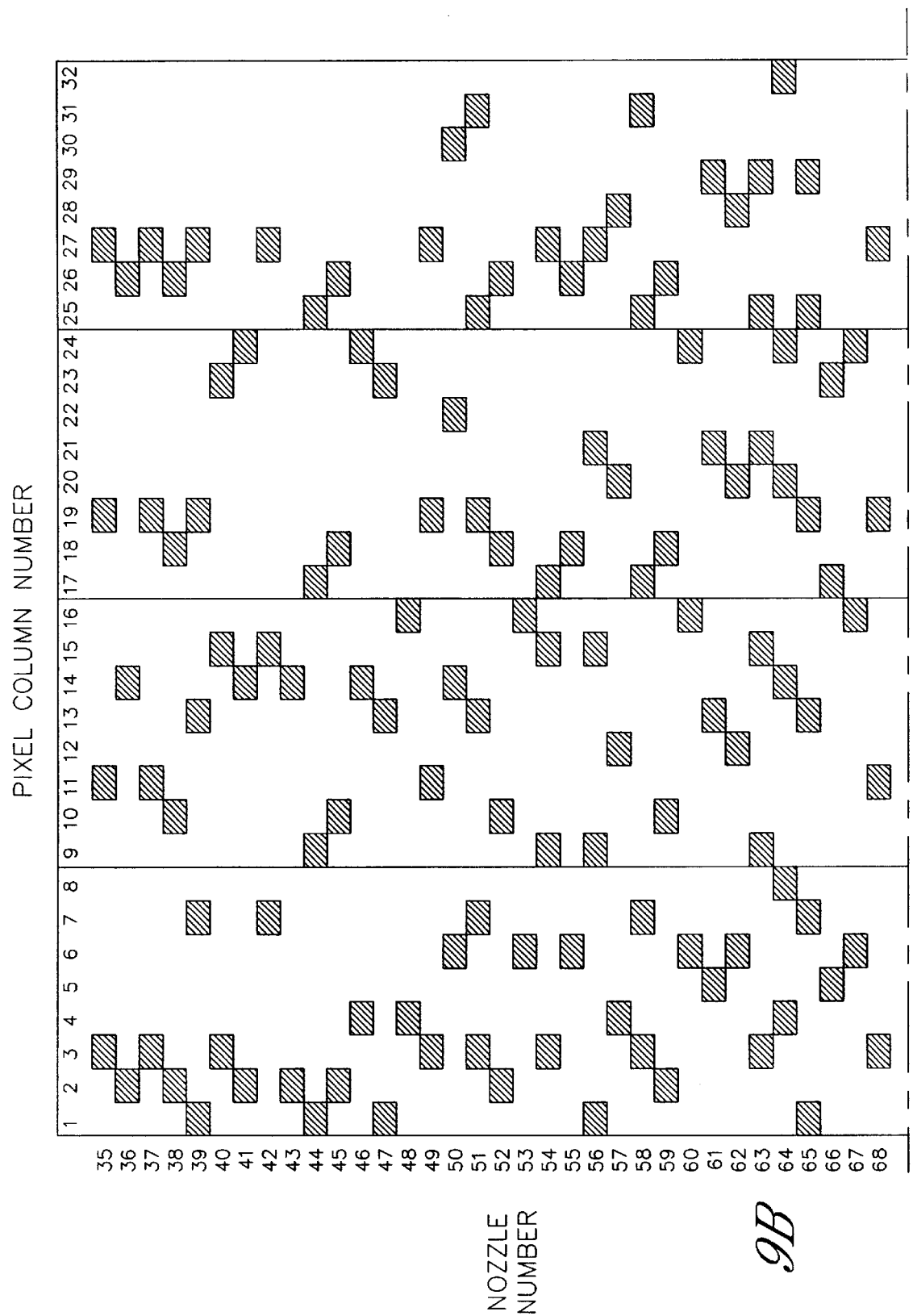
Figure 9C:
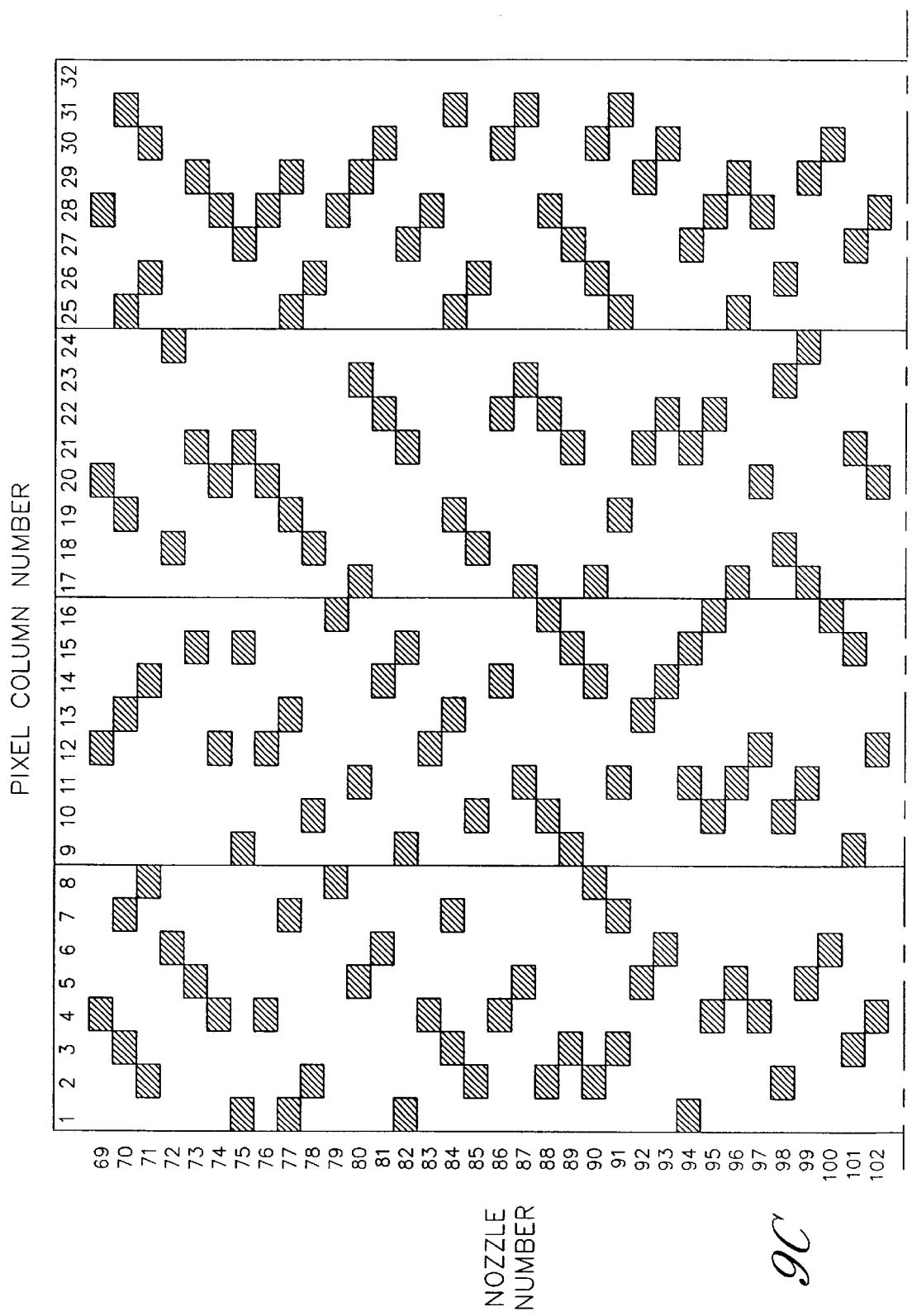
Figure 9D:
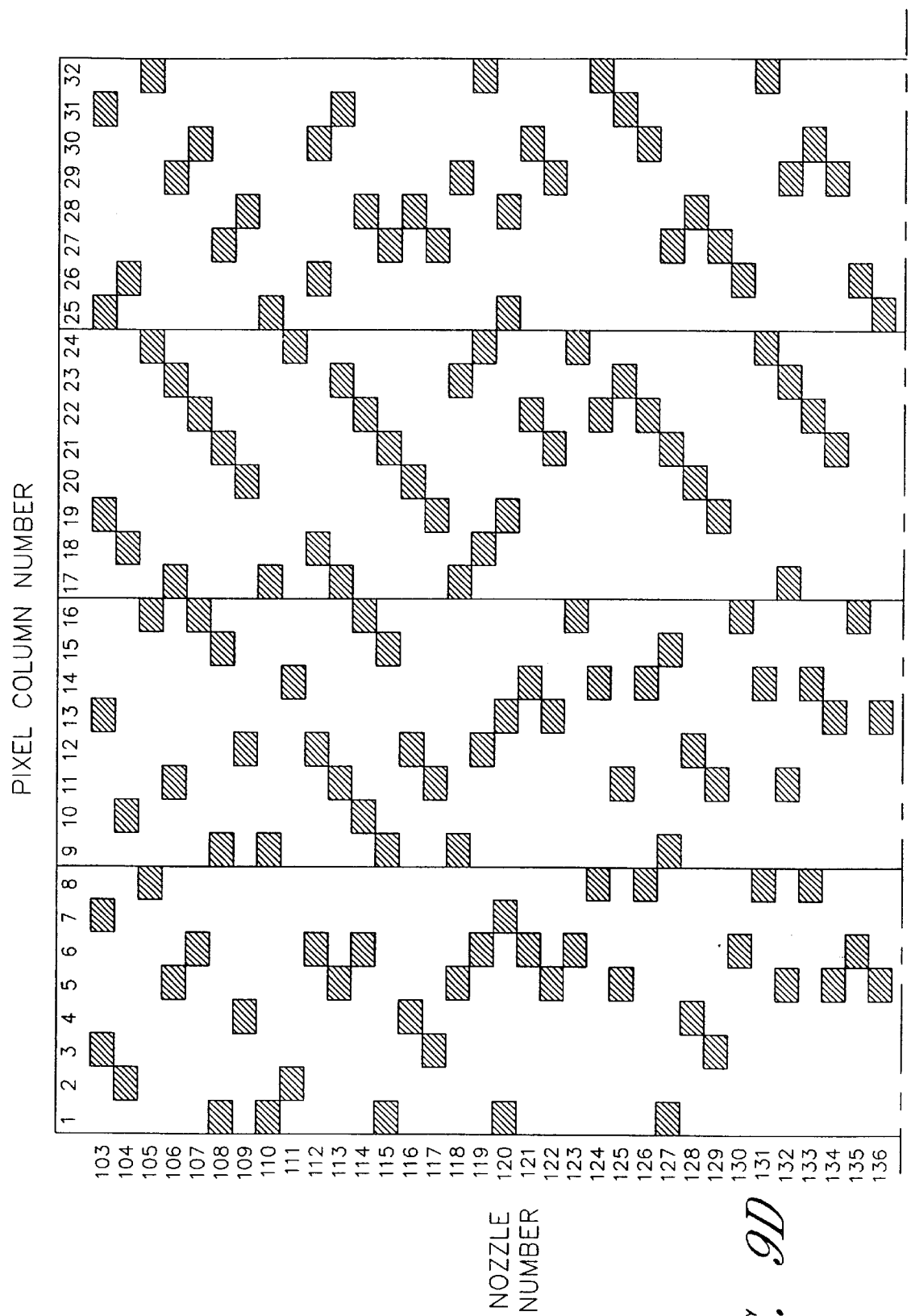
Figure 9E:
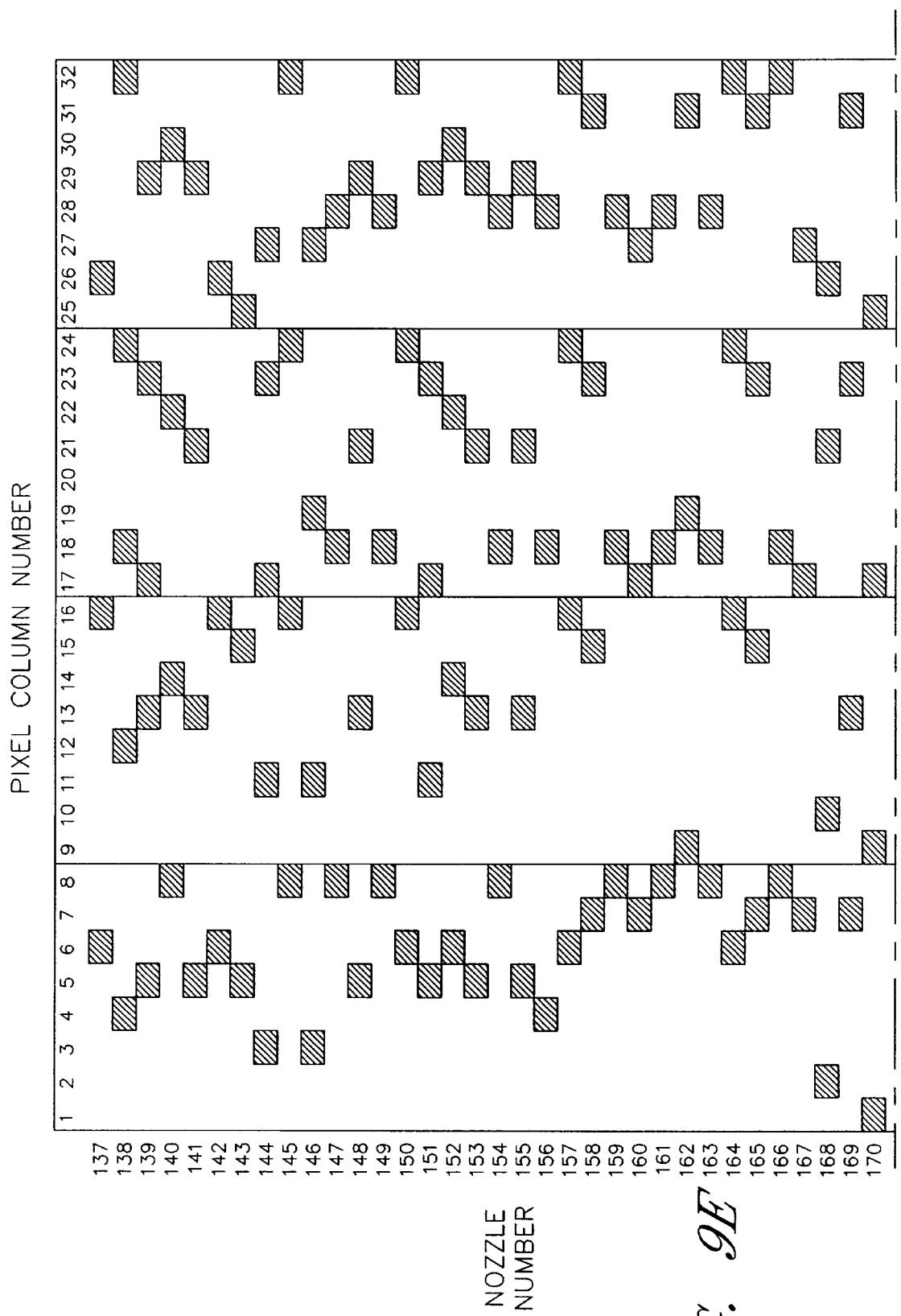
Figure 9F:
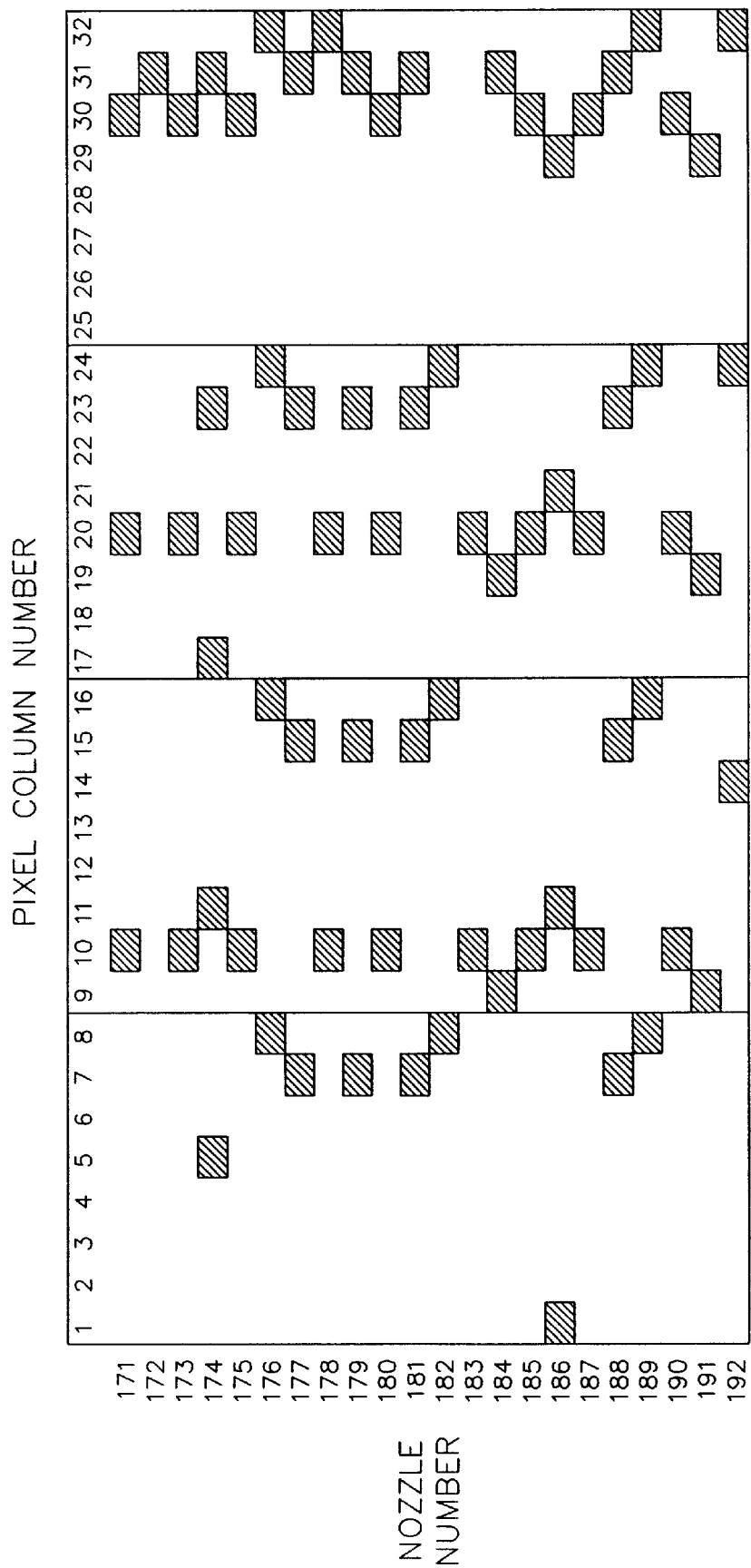

Referring now to FIGS. 7 and 8, however, it will be demonstrated that with the careful preparation of multi-pass print masks for the ink ejection nozzles, it can be guaranteed that only a known subset of the address strobes will need to be made over each pixel column. By skipping the remaining unused address strobes over each pixel column, the three microseconds each for these strobes is no longer needed, and print speed may be substantially increased.

The general principles of multi-pass printing are well understood by those of skill in the art and are thus not described in detail herein. In general, multi-pass printing involves distributing ink droplet deposition to each raster line of the image between several different nozzles of the ink jet print head. In an eight pass print mode, for example, each nozzle associated with a selected raster line may be assigned to deposit ink onto about 1/8 of the pixel locations of the raster line. In one simple embodiment, a first nozzle may be assigned to pixel locations 1, 9, 17, 25, 33, and so on. A second nozzle may be assigned to pixel locations 2, 10, 18, 26, 34, and so on. With eight nozzles assigned to the raster line of pixel locations, each nozzle thus prints on one out of eight pixel locations to complete the raster line.

In FIG. 7, one possible droplet deposition pattern for eight pass printing is illustrated. In this Figure, the first 32 pixel locations of a raster line 80 are illustrated. The masks repeat for each additional 32 pixel segment across the width of the image. During, for example, a complete color fill of the raster line, the first pass will deposit ink onto locations 2, 8, 26, and 30 of the raster line 80 as indicated by the filled circles at these positions. During the second pass, ink is deposited onto positions 1, 15, 23, and 31. As shown by the other filled circles in passes 3 through 8, the raster line is filled in completely over the course of the eight passes by depositing ink in four of the 32 positions (that is, one-eighth of the positions) with each pass.

The print masks illustrated in FIG. 7 may be advantageously used in conjunction with the print head described with reference to FIGS. 3–6 in order to substantially increase the speed of the print carriage over the media. This is illustrated in FIG. 8. In this embodiment, printing is accomplished by using 192 of the 208 nozzles, and incrementing the media in 24 nozzle width increments. With this procedure, bands of raster lines which are 24 lines wide will pass first under nozzles 1–24, then under nozzles 25–48, and then sequentially under nozzles 49–72, 73–96, 97–120, 121–144, 145–168, and 169–192 to complete the eight passes. Thus, each raster line will be passed over by eight nozzles during this process. For example, nozzles 1, 25, 49, 73, 97, 121, 145, and 169 are assigned to print one raster line of every 24. As another example, nozzles 21, 45, 69, 93, 117, 141, 165, and 189 are assigned to deposit ink onto another set of raster lines which are spaced 24 raster lines apart. This is the nozzle group illustrated in FIG. 8.

Referring now to FIG. 8, a raster line 82 on the media is first vertically aligned beneath nozzle 21 of the ink jet print head. If the image requires ink to be printed on a pixel location for which the twenty-first jet is responsible, indicated by the filled circles in selected pixel locations, this dot is printed during the first pass of the print head.

After printing to these pixels, the recording media is advanced by an amount equal to the width of 24 raster lines, such that the raster line 82 is now vertically aligned with nozzle 45. Now the raster line 82, which has been partially printed on by jet number 21, is printed on, as required by the print data, by nozzle 45 of the print head during a second pass of the print head over the recording medium. The recording media is then once again advanced by an amount equal to the height of twenty-four raster lines. The raster line 82 is now aligned with the sixty-ninth jet of the print head, and is printed upon, as necessary, in accordance with another jet mask during a third pass of the print head over the recording medium. The above-described process is repeated until drops required to be printed in the raster line have been deposited by additional nozzles 93, 117, 141, 165, and 189. As is understood by those in the art, an eight pass mode with a 24 nozzle increment with each pass requires the definition of 24 groups of eight print masks. Each print mask is applied to one of eight nozzles in each group of eight nozzles assigned to print individual raster lines. As in FIGS. 7 and 8, each group of eight print masks distributes the pixel locations of a raster line between the eight nozzles of each group. During printing, of course, all nozzles of the ink jet print head are simultaneously depositing ink according to the print data and their associated print mask.

In the specific embodiment of FIG. 8, the twenty-four nozzle media advance per pass, together with the print masks used for nozzles 21, 45, 69, 93, 117, 141, 165, and 189 are selected such that when the ink jet cartridge described above with reference to FIGS. 3–6 is used, only half of the address strobes need to be asserted over each pixel location. As shown in FIG. 6, nozzles 21, 117, 141, and 165 are associated with address lines 2, 12, 8, and 4 respectively. These are all even numbered address lines. Nozzles 45, 69, 93 and 189 are associated with address lines 11, 7, 3, and 13 respectively. These are all odd numbered address lines. To reduce the number of address strobes which need to be made at each pixel location of the raster line, even pixel numbers, that is, pixels 2, 4, 6, 8, etc. from left to right, are printed with nozzles associated with even address lines. Furthermore, odd pixel numbers, that is, pixels numbered 1, 3, 5, 7, etc. from left to right are printed with nozzles associated with odd address lines. In the case of the eight nozzle group of FIG. 8, this means that only nozzles 21, 117, 141, and 165 are used to print onto even pixels and only nozzles 45, 69, 93, and 189 are used to print onto odd pixels. This design is implemented in the eight print masks shown in FIG. 8. Nozzle 21, for example, which is coupled to an even address line, is assigned to print pixels 2, 8, 26, and 30, which are all even pixels. Nozzle 45, which is coupled to an odd address line, is assigned to print pixels 1, 15, 23, and 31, which are all odd pixels. With these print masks, only odd address lines will need to be asserted over odd pixels, and only even address lines will need to be asserted over even pixels. It will be appreciated that the even/odd pixel column assignments could be reversed such that even addresses are asserted over odd pixel columns and odd address lines are asserted over even pixel columns. Thus, with such print masks used with the print head of FIGS. 3–6, only six or seven address strobes, rather than thirteen, need to be made over each pixel, allowing almost a doubling of carriage speed without a significant sacrifice to print quality. Of course, FIG. 8 shows only one of the 24 nozzle groups which are used in this eight pass mode. To achieve the potential increase in carriage speed, the print masks for each of the 24 groups of eight nozzles must be designed with the same principles described above which are used to construct the print masks of FIG. 8 for nozzles 21, 45, 69, 93, 117, 141, 165, and 189. In table format, set forth below are the nozzles which can be used for pixel columns assigned to even address strobes and pixel columns assigned to odd address strobes for each of the 24 nozzle groups in the eight pass mode of FIG. 8.

TABLE I

| Nozzle Group | Nozzle Choices For Even Address Pixel Columns | Nozzle Choices For Odd Address Pixel Columns |
|---|---|---|
| 1 | 25, 49, 73, 169 | 1, 97, 121, 145 |
| 2 | 2, 122, 146, 170 | 26, 50, 74, 98 |
| 3 | 51, 75, 99 | 3, 27, 123, 147, 171 |
| 4 | 4, 28, 148, 172 | 52, 76, 100, 124 |
| 5 | 77, 101, 125 | 5, 29, 53, 149, 173 |
| 6 | 6, 30, 54, 174 | 78, 102, 126, 150 |
| 7 | 103, 127, 151 | 7, 31, 55, 79, 175 |
| 8 | 32, 56, 80 | 8, 104, 128, 152, 176 |
| 9 | 9, 129, 153, 177 | 33, 57, 81, 105 |
| 10 | 58, 82, 106 | 10, 34, 130, 154, 178 |
| 11 | 11, 35, 155, 179 | 59, 83, 107, 131 |
| 12 | 84, 108, 132 | 12, 36, 60, 156, 180 |
| 13 | 13, 37, 61, 181 | 85, 109, 133, 157 |
| 14 | 14, 110, 134, 158 | 38, 62, 86, 182 |
| 15 | 39, 63, 87 | 15, 111, 135, 159, 183 |
| 16 | 16, 40, 136, 160, 184 | 64, 88, 112 |
| 17 | 65, 89, 113 | 17, 41, 137, 161, 185 |
| 18 | 18, 42, 66, 162, 186 | 90, 114, 138 |
| 19 | 91, 115, 139 | 19, 43, 67, 163, 187 |
| 20 | 44, 68, 92, 188 | 20, 116, 140, 164 |
| 21 | 21, 117, 141, 165 | 45, 69, 93, 189 |
| 22 | 70, 94, 118 | 22, 46, 142, 166, 190 |
| 23 | 23, 47, 143, 167, 191 | 71, 95, 119 |
| 24 | 96, 120, 144 | 24, 48, 72, 168, 192 |

Construction of a print mask for each of the 192 utilized nozzles (24 groups of eight) may be done by selecting only those nozzles listed above for even and odd pixels respectively of each raster line, as done with nozzle group 21 illustrated in FIG. 8. When this is done, printing each pixel column requires alternately strobing either only even address lines, or only odd address lines. For the print head of FIGS. 3–6, such print masks will guarantee that no more than 7 address lines need to be asserted over any pixel column as the print head passes over the media. Physically, this means that interleaved alternate sets of nozzle sub-columns are being used to deposit ink droplets in alternating pixel columns. Referring to the nozzle arrangement of FIG. 4, for example, during the print process, odd pixel columns only receive ink droplets from sub-columns 64*a*, 64*c*, 64*e*, 64*g*, 64*i*, 64*k*, and 64*m*. Even pixel columns only receive ink droplets from sub-columns 64*b*, 64*d*, 64*f*, 64*h*, 64*j*, and 64*l*.

It can be appreciated from the above discussion that the appropriate division of even and odd pixel locations between the nozzles of a group is dependent on the specific arrangement of nozzles on the print head and their assignment to different address lines. Which nozzles make up a group depends on the number of passes and the number of nozzle positions per media increment between passes. Once the nozzles in each group are identified, they can then be separated into two sets depending on whether they are connected to an odd or even address line. Even and odd pixel positions in a raster line can then be assigned to the nozzles according to their membership in the even or odd set of nozzles within the group of nozzles.

Several additional print mask principles are also preferably observed during the print mask design process. The first is that no nozzle should eject an ink droplet onto pixel locations which are less than four pixel positions apart in the raster line. This prevents firing a nozzle faster than its rated duty cycle even when the carriage speed is increased in accordance with the invention. Also, vertically adjacent nozzles should not be fired on the same pass. With the cartridge embodiment of FIGS. 3–6, following this rule is not difficult, because vertically adjacent nozzles tend to be associated with alternating even and odd address lines.

FIGS. 9A to 9F illustrate the print masks for each of the 192 utilized nozzles of the 208 jet print head of FIGS. 3–6 constructed in one embodiment of the invention in accordance with these principles. As discussed above, the masks repeat for each set of 32 pixel columns across the width of the printed image. With these masks, no two vertically adjacent nozzles print vertically adjacent pixel locations, and at least three pixel locations are provided between each assigned print location within a raster line. In addition, by referring to FIGS. 9A–9F in conjunction with FIG. 6A, it can be seen that the nozzles assigned to print alternate pixel columns are fired by asserting alternately either only even address lines or only odd address lines. For example, nozzles 4, 9, 11, 13, 16, 21, 25, 30, 39, 44, 47, 56, 65, 75, 77, 82, 94, 108, 110, 115, 120, 127, 170, and 186 are assigned to print onto pixel column number 1. Referring to FIG. 6A, it is found that all of these nozzles are coupled to even address lines. Furthermore, nozzles 1, 10, 20, 22, 27, 29, 31, 33, 36, 38, 41, 43, 45, 52, 59, 71, 78, 85, 88, 90, 98, 104, and 111 are assigned to print onto pixel column number 2. Again referring back to FIG. 6A, all of these nozzles are fired by asserting odd address lines. Thus, as described above, only even addresses are strobed over pixel column 1, only odd addresses are strobed over pixel column 2, and so on across the image.

In color ink jet printers, it is common to have four ink jet cartridges with their nozzle arrays spaced apart by an integer number of pixel locations. Because each address line is typically tied in parallel to all of the cartridges, each cartridge must be firing even or odd address lines at the same time. Thus, the integer number of pixel locations separating the cartridges is preferably an even number so that all nozzle columns pass over even or odd pixel columns simultaneously. If two cartridges are an odd number of pixel positions apart, this can be compensated for by rotating leaf masks for one of the cartridges by one bit left or right.

Several modifications to the above described methods and systems may be utilized. For example, even though nozzle separation based on even and odd address line connection is advantageous for some cartridges (such as the cartridge described with reference to FIGS. 3–6), it is possible that address/nozzle assignments may result in an uneven distribution of nozzles between even and odd sets for some raster lines. In some cases, it is possible that all the jets in a particular group are connected to only even address lines, only odd address lines, or perhaps only to a single one of the address lines. This issue may be resolved in two possible ways. First, there may be a different allocation of address lines to two sets that makes the nozzle assignments come out more evenly. Instead of even/odd division of address lines, the two sets may be address lines 1, 4, 5, 6, 9, 11, 12 for even pixel columns and 2, 3, 7, 8, 10, 13 for odd pixel columns. As another alternative, the amount of media increment between passes can be selected to produce advantageous nozzle groupings for the raster lines. For example, in the case of a 26 nozzle increment in an eight pass mode with the print head of FIGS. 3–6, the first nozzle group is made up of nozzles 1, 27, 53, 79, 105, 131, 157, and 183. As shown in FIG. 6, all of these nozzles are connected to address line 1. The same single address line connection is true for the other nozzle groups of this embodiment. Thus, if this increment is used, all thirteen address strobes need to be asserted with each pixel column. This problem has been solved in the embodiment of FIG. 8 and Table 1 by using a 24 nozzle increment rather than a 26 nozzle increment. As set forth above, this makes the first nozzle group into nozzles 1, 25, 49, 73, 97, 121, 145, and 169. This group of nozzles is evenly split between even and odd address lines.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of increasing the throughput of an ink jet printer, wherein:
   (1) the ink jet printer comprises an array of ink ejection nozzles arranged as a plurality of spaced apart sub-columns;
   (2) the ink jet printer deposits ink droplets onto a series of adjacent pixel columns as the array moves with respect to the series of adjacent pixel columns,
   (3) wherein the spaced apart sub-columns are sequentially actuated as the nozzle array passes over each one of pixel columns to deposit ink onto the pixel locations therein,
   (4) and wherein the throughput of the printer is limited by the time requited to actuate all of the sub-columns as the array passes over each one of the pixel columns;

said method of increasing the printer throughput comprising:
  separating said sub-columns into two groups, a first group comprising selected ones of said spaced apart sub-columns, and a second group comprising the remaining sub-columns; and
  alternating ink droplet deposition between said first and second groups of sub-columns as said array moves in a multi-pass print mode such that alternating pixel columns are printed with alternating first and second groups of sub-columns, whereby only the first or second group of sub-columns, rather than all of the sub-columns, are required to be actuated over any individual pixel column so as to produce a complete image in which any pixel location may receive one or more ink droplets during the multi-pass print process.

2. An ink jet printer that prints images on print media by depositing ink droplets onto a two-dimensional grid of pixel locations, said grid defining a series of vertically extending pixel columns and a series of horizontally extending raster lines, said ink jet printer being configured to print in a multi-pass mode for high quality printing at a high throughput rate, said ink jet printer comprising:
  a horizontally moveable print head comprising an array of ink ejection nozzles, wherein said print head and said array of nozzles have the following features:
    (1) said array of ink ejection nozzles is arranged into at least one vertically extending column of ink ejection nozzles such that as said print head passes horizontally over said print media each ink ejection nozzle passes over one of said horizontally extending raster lines;
    (2) wherein each one of said ink ejection nozzles is coupled to a power line and an address line, and wherein each nozzle ejects an ink droplet only when both said power line and said address line are asserted;
    (3) wherein said vertically extending column of ink ejection nozzles is further arranged into a plurality of vertically extending sub-columns of ink ejection nozzles that are horizontally spaced apart from one another;
    (4) wherein all nozzles in the same sub-column are coupled to a common address line, and wherein nozzles in different sub-columns are coupled to different address lines;
    (5) wherein the horizontal distance between a leftmost and a rightmost sub-column defines a nozzle column width which is less than the width of one of said pixel columns;
    (6) and wherein as the print head passes horizontally over said print media, said vertically extending sub-columns become sequentially vertically aligned with the centers of the vertically extending pixel columns such that said address lines may be sequentially asserted as the nozzle column passes over each pixel column to enable ink droplet deposition from one sub-column at a time;
  said ink jet printer further comprising:
  processing and logic circuitry for controlling ink ejection by selectively asserting said address and power lines in accordance with print data and a print mask;
  a memory coupled to said processing and logic circuitry and storing said print mask, wherein said print mask defines a droplet deposition pattern for each nozzle which guarantees, regardless of print data content, that at most only approximately half of said address lines will be required to be asserted as said print head passes over each pixel column, thereby making it unnecessary to move the print head slow enough to assert all of said address lines over each pixel column and thus allowing for a higher print head speed over the print media.

3. A method of depositing ink droplets onto a grid or pixel locations comprising a series of adjacent pixel columns with an array of ink ejection nozzles, wherein said array of ink ejection nozzles is configured in a plurality of spaced apart sub-columns, said method comprising depositing ink droplets in a multi-pass print mode onto pixels of a first pre-defined subset of said adjacent pixel columns using only nozzles positioned in a first pre-defined subset of said plurality of spaced apart sub-columns so as to produce a complete image in which any pixel location may receive one or more ink droplets during the multi-pass print process.

4. The method of claim 3, additionally comprising depositing ink droplets onto pixels in a second pre-defined subset of said adjacent pixel columns using only nozzles positioned in a second pre-defined subset of said plurality of spaced apart sub-columns.

5. The method of claim 4, wherein said second pre-defined subset of said plurality of spaced apart sub-columns includes no sub-columns in common with said first pre-defined subset.

6. The method of claim 5, wherein said first pre-defined subset of said plurality of spaced apart sub-columns comprises approximately one half of said plurality of spaced apart sub-columns and wherein said second pre-defined subset of said plurality of spaced apart sub-columns comprises the remainder of said plurality of spaced apart sub-columns.

7. An ink jet printer for printing onto a print media having defined thereon a series of adjacent pixel columns defining a two-dimensional grid of pixel locations, said ink jet printer comprising:
  a moveable print head comprising an array of ink ejection nozzles, wherein said array of ink ejection nozzles are arranged into a plurality of sub-columns aligned parallel to said pixel columns such that said sub-columns pass sequentially over a segment of each pixel column as said print head is passed over said print media;
  data processing circuitry for controlling ink ejection from said array of ink ejection nozzles;
  a memory coupled to said data processing circuitry and storing a print mask used by said data processing circuitry to control ink ejection, wherein said print mask defines a droplet deposition pattern for each nozzle which guarantees that only an identical pre-defined subset of said sub-columns of nozzles selectively deposit ink onto each pixel location of said pixel columns.

8. A method of increasing the throughput of an ink jet printer having a moving print carriage mounting at least one ink jet print head having an array of ink ejection nozzles thereon for selectively printing onto a set of pixel columns on print media, said method comprising controlling ink ejection from an array of nozzles on said ink jet print head with a multi-pass print mask such that (1) only a first pre-defined portion of said ink ejection nozzles are enabled for ink ejection over a first pre-defined set of said pixel columns, and such that (2) only a second pre-defined portion of said ink ejection nozzles are enabled for ink ejection over a second pre-defined set of said pixel columns.

9. The method of claim 8, wherein said array of ink ejection columns is arranged as a series of alternating odd and even sub-columns, wherein said set of pixel columns is arranged as a series of alternating odd and even pixel columns, wherein only nozzles positioned in said odd sub-columns are enabled for printing onto pixels positioned in said odd pixel columns and wherein only nozzles positioned in said even sub-columns are enabled for printing onto pixels positioned in even pixel columns.

10. A method of increasing the speed of multi-pass printing onto a series of adjacent pixel columns with an ink jet print head, said ink jet print head comprising a plurality of sub-columns of ink ejection nozzles actuated by a corresponding plurality of address lines, said method comprising asserting only a pre-defined subset of said address lines within each of said pixel columns while printing to each pixel in said pixel columns.

11. A method of ink jet printing onto a plurality of pixel columns using an array of ink ejection nozzles arranged in a plurality of spaced apart sub-columns, said method comprising:

depositing ink droplets onto a first pixel column using only nozzles positioned in a first pre-defined subset of said spaced apart sub-columns;

depositing ink droplets onto a second pixel column adjacent to said first pixel column using only nozzles positioned in sub-columns different from said first pre-defined subset of said spaced apart sub-columns;

repeating said acts of depositing ink droplets in a multi-pass print mode to selectively deposit ink onto each pixel in said first and second pixel columns.

12. The method of claim 11, additionally comprising depositing ink droplets onto a third pixel column adjacent to said second pixel column using only nozzles positioned in said first pre-defined subset of said spaced apart sub-columns.

13. The method of claim 12, additionally comprising depositing ink droplets onto a fourth pixel column adjacent to said third pixel column using only nozzles positioned in sub-columns different from said first pre-defined subset of said spaced apart sub-columns.

14. A method of increasing the throughput of an ink jet printer, wherein said ink jet printer comprises an array of ink ejection nozzles arranged as a plurality of spaced apart sub-columns, and wherein said array of ink ejection nozzles deposits ink droplets onto a series of adjacent pixel columns as said array moves with respect to said series of adjacent pixel columns, said method comprising:

separating said sub-columns into a plurality of groups of sub-columns;

assigning each pixel column to one of said groups; and depositing ink droplets in accordance with said separating and said assigning such that each pixel in said pixel column receives ink droplets only from its assigned group of sub-columns.

15. The method of claim 14, wherein each sub-column is a member of exactly one group.

16. The method of claim 14, comprising separating said sub-columns into two, three, or four groups.

17. The method of claim 14, comprising separating said sub-columns into two groups.

18. The method of claim 14, wherein said separating comprises separating said sub-columns into first and second groups of sub-columns, with each group each having approximately equal numbers of sub-columns.

19. The method of claim 18, wherein said assigning comprises assigning every other pixel column to said first group, and the remaining pixel columns to said second group.

* * * * *